Nov. 13, 1945.  L. V. McCARTY  2,388,793
SNAP ACTION CONSTANT LEVEL DEVICE
Filed Nov. 5, 1943  2 Sheets-Sheet 1
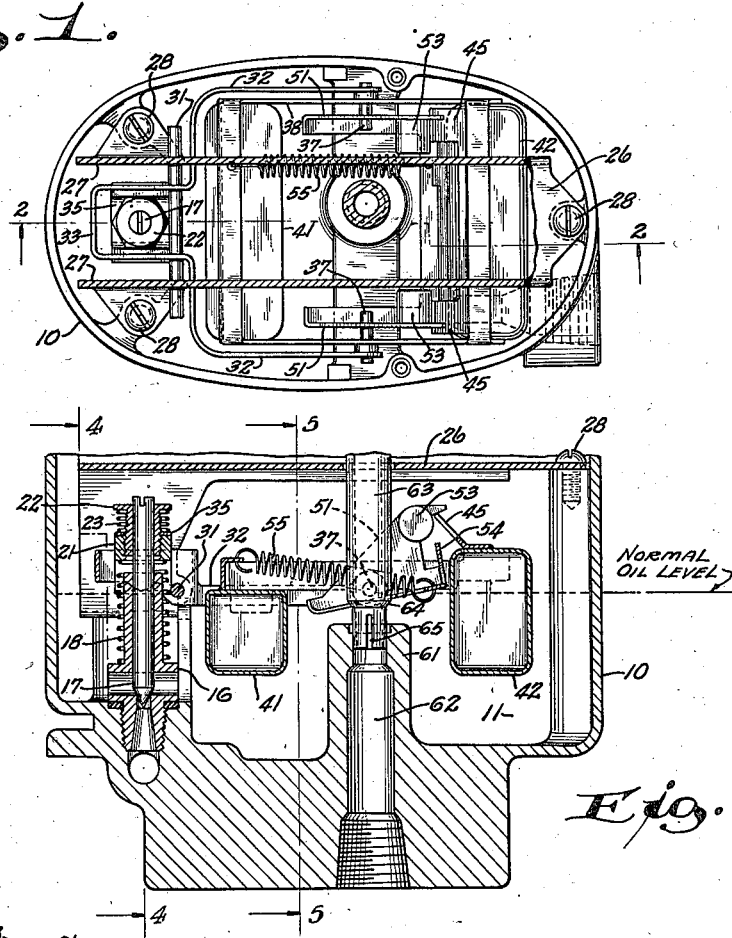
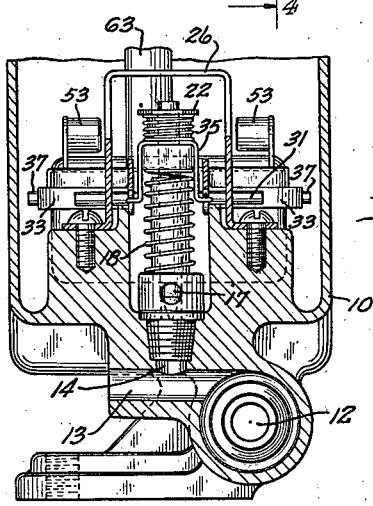
INVENTOR.
LOURDES V. McCARTY
BY John W. Michael
ATTORNEY.

Nov. 13, 1945.   L. V. McCARTY   2,388,793
SNAP ACTION CONSTANT LEVEL DEVICE
Filed Nov. 5, 1943   2 Sheets-Sheet 2

INVENTOR.
LOURDES V. McCARTY
BY John W. Michael
ATTORNEY.

Patented Nov. 13, 1945

2,388,793

UNITED STATES PATENT OFFICE 2,388,793

SNAP ACTION CONSTANT LEVEL DEVICE

Lourdes V. McCarty, Milwaukee, Wis., assignor to Automatic Products Company, Milwaukee, Wis., a corporation of Wisconsin Application November 5, 1943, Serial No. 509,097

10 Claims. (Cl. 137—68)

This invention relates in general to devices for controlling the supply of liquid fuel from a reservoir to a burner of the gravity feed type, and more particularly to a device for maintaining a constant level in a chamber intermediate the reservoir and burner and thereby maintaining a desired flow of fuel actually supplied to the burner.

In gravity feed type burners for liquid fuel, the burner can be operated properly only if supplied with the desired flow or required quantity of fuel, and such flow or quantity is most readily obtained by controlling the level of the fuel in a chamber ahead of the burner to secure a constant hydrostatic head. The constant level can readily be maintained by adjustment of a valve controlling flow of the liquid fuel into the chamber. Such valve adjustment is obtainable by constantly biasing the inlet valve in the open position and by employing a float or floats to move the valve toward or into closed position as the level of the fuel changes. When the heating system is used on a vehicle on either land or water, the entire system is subject to tilting relative to the normal horizontal position which disturbs the operation of the float and also increases the resistance of the inlet valve to closure by the float.

It is therefore an object of the present invention to provide means for maintaining a constant level of liquid fuel in a chamber between a reservoir and a burner even though the chamber may be tilted from the normal horizontal position.

Another object of the invention is to provide a liquid fuel control device in which the level of the fuel in a chamber is controlled by a float-actuated snap-action means for closing the inlet valve into the chamber regardless of the tilting of the device from the normal position thereof.

Another object of the invention is to provide a constant liquid fuel level control device in which the level of the fuel in a chamber is controlled by a float or float system having different displacement portions for actuating a toggle mechanism to snap from one position to another position upon rise in the oil level, even though the chamber is tilted up to thirty degrees from its normal horizontal position.

Objects and advantages other than those above set forth will be apparent from the following description when read in connection with the accompanying drawings, in which:

Fig. 1 is a top plan view of a constant level device embodying the present invention, the cover thereof being removed and a portion of the supporting bracket for the internal structure being cut away to show the arrangement of such structure more clearly;

Fig. 2 is a vertical cross-sectional view taken on the plane of line 2—2 of Fig. 1 to show the arrangement and construction particularly of the float system and the toggle mechanism operated thereby, the view illustrating the position of such parts at the normal oil level;

Fig. 4 is a vertical sectional view taken on the plane of line 4—4 of Fig. 2 and looking from the left at the end of the constant level device;

Figure 3:
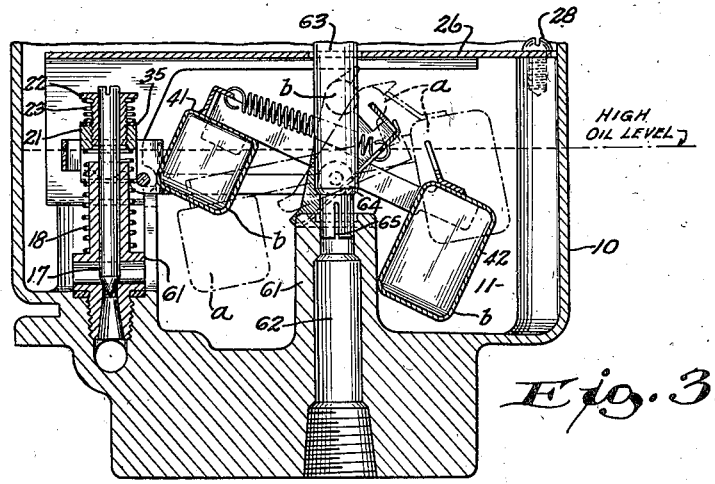
Fig. 3 is a view similar to Fig. 2 but illustrating in dotted lines the position of the parts in the first of the two steps required in coming to high oil level and illustrating in full lines the second of the steps required of the mechanism in coming to high oil level.
Figures 5, 6:
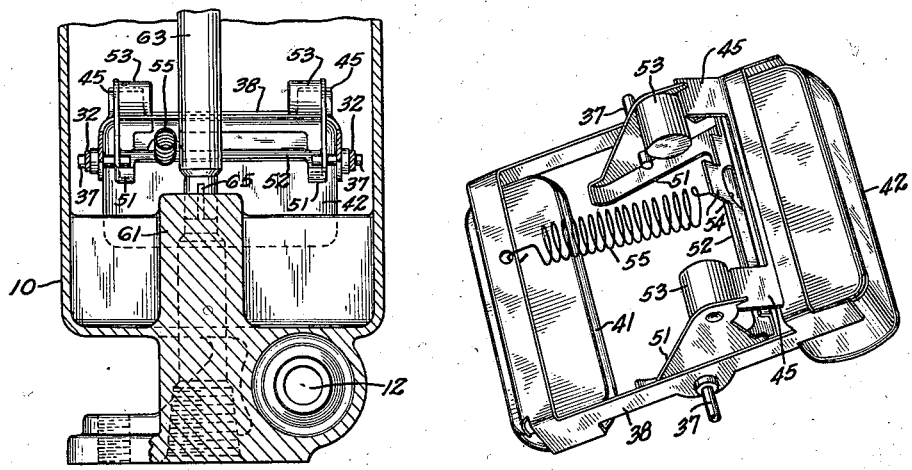
Fig. 5 is a vertical, sectional view taken on the plane of line 5—5 of Fig. 2 and looking from the left.
Fig. 6 is a perspective view showing the float system and toggle mechanism separated from all other parts of the device.

Referring more particularly to the drawings by characters of reference, the reference numeral 10 designates a casing enclosing the other portions of the device within an oil supply chamber 11 in which the oil level is to be maintained substantially constant, the casing having formed therein portions of the conduits by which the oil flows to and away from the chamber 11. The oil flows into the casing 10 from a reservoir by way of a conduit (neither of which is shown) connecting with passage-ways 12, 13, and 14 formed in the wall of the casing. The vertical inlet passage 14 is threaded internally to receive a valve housing 16 of generally cruciform shape having communicating axial and longitudinal passages therethrough to receive the inlet valve body 17 shown as being of the needle valve type and seating on the edge formed by the intersection of the axial and longiudinal passages in the valve housing. The valve 17 controls the flow of oil into the chamber 11 and is biased toward open position by a spring 18 seated between the lateral arms of the valve housing 16 and a nut 21. The nut threadedly engages a sleeve 22 which is pressed or otherwise secured on the upper stem portion of the valve 16 and is held in predetermined position by a spring 23 acting between the nut 21 and a peripheral flange on the upper end of the sleeve 22. The nut 21 has a substantially cubical exterior configuration and is held against turning by the spring 23 so that the compression of the valve opening spring 18 may be adjusted by turning the valve 16 and the sleeve 22 by a suitable tool inserted in a slot in the upper end of the valve stem.

A bracket of generally channel shape, with a top portion 26 and side wall portions 27 depending therefrom, is mounted in the casing 10 by screws 28 extending through the top portion of the bracket at one end thereof and through lugs extending laterally from the lower edges of the side wall portions of the bracket at the other end thereof. The bracket side walls 27 have a pin 31 extending therethrough in proximity to the inlet valve 16, 17, to serve as a pivot for the floats and the mechanism carried thereby.

A float lever, generally shaped as a yoke, includes side bars 32 connected by a central bar 33 and is pivotally mounted on the pin 31 and extends around the inlet valve 16, 17. The connecting yoke bar 33 has ears 34 depending therefrom and provided with apertures for receiving the ends of a substantially U-shaped member 34 resting on and engaging the sides of the adjusting nut 21 and formed with an aperture to allow the stem portion of the valve 16 to extend upwardly therethrough. The U-shaped member 35 is provided at the ends thereof with lateral ears extending into and engaging in apertures in the ears 34 of the float lever or yoke 32, 33. As shown, member 35 is held in contact with the upper side of the nut 21 by the spring 23 and, due to its connection with the float yoke, holds the nut 21 against turning, thus making it possible to adjust the inlet valve by turning the valve itself. The connection between the member 35 and the float yoke 32, 33 causes closing of the valve 16 responsive to movement of a float system which lifts the end of the yoke 32, 33 and exerts a downward pressure by way of the connecting member 35 on the valve. The side bars 33 of the float yoke are provided with trunnions 37 extending inwardly from the yoke side bars and serving as mounting and pivoting points for a frame 38 having floats 41 and 42 extending downwardly from the outer ends thereof. Floats 41, 42 are substantially parallelograms in shape and are fastened to the frame 38 at the upper or top sides of such floats in substantially the same positions. It will be observed, however, that float 42 is substantially larger than float 41, and displaces more oil than can be displaced by float 41. Floats 41 and 42 may, of course, be made integral so long as float portion 42 is made larger than float portion 41 for the purpose of securing continuing buoyancy of float portion 42 after portion 41 is submerged.

The end of the float frame 38, to which the float 42 is secured, is also provided with arms or ears 45 extending upwardly from the frame and inwardly toward the center of the frame to provide stops for an over-center toggle mechanism. The toggle mechanism comprises arms 51 pivotally mounted on trunnions 37 and joined by a connecting bar 52. Each of the toggle arms is provided with a weight 53 extending inwardly from the arms and at a substantial distance from a vertical plane through the center of the trunnions 37. The connecting bar 52 has a portion 54 extending upwardly and inwardly therefrom to provide a connecting point for one end of a helical spring 55 under tension which is connected at the other end with the portion of the float frame 38 extending across the top of the float 41. The spring 55 is, of course, offset to one side of the center line through the entire device to avoid interference with other portions of the structure. The upper ends of the toggle arms 51 extend toward the float 42 for a sufficient distance to engage the stops 45 when the toggle arms are in a position corresponding to normal oil level, as shown in Fig. 2, or high oil level, as shown in dotted line in Fig. 3. The floats, float frame, and lever and the toggle mechanism together form a float system which moves to give closing force to the inlet valve.

A tubular extension 61 rises from the bottom of the casing 10 and provides a discharge passage 62 leading from the oil supply chamber 11 and connected by a suitable pipe with a burner (neither of which is shown). A metering valve 63 extends into the discharge passage 62 and is formed with a shoulder 64 to rest on a seat formed at the upper end of the discharge passage 62. The metering valve is tubular for at least a portion of its length and has a metering slot 65 cut into the lower end thereof moving in the discharge passage 62 and has a venting aperture (not shown) above the high oil level. The metering valve is of the construction shown in Patent 2,183,815 issued to Roy W. Johnson on December 19, 1939, and accordingly need not be further described.

In operation, when the oil is at the normal level, as shown in Fig. 2, the toggle arms 51 rest on the stops 45 and the central axis of the spring 55 is above the horizontal line through the center of the trunnions 37 at all times and hence opposes the tendency of the weights 53 to move the float system in a clockwise direction. The portion of the effect of the weights 53, which is not balanced by the spring 55, is balanced by the displacement of the float 42 in excess of the displacement of the float 41. In other words, the mechanism is an over-center toggle in which the position of the weights instead of a spring determines the position of the mechanism. In the normal position, the force to be overcome by the displacement of the float 42, plus the tension of the spring 35, is the clockwise turning moment of the weights 53, due to the action of gravity, times the length of the lever arm from the center of the trunnions 37 to the axis through the center of gravity of the weights 53. So long as the oil is at the normal level the excess displacement of the float 42 is sufficient only to keep the float system in balance and no movement thereof takes place.

However, when the oil level rises, the float system also rises and a pressure is exerted by way of the yoke 32, 33 on the inlet valve 16 to tend to force the valve into closed position. But if the valve 16 sticks in its housing, or is held for any other reason, the oil level continues to rise until the float 41 is submerged and accordingly no longer contributes any buoyancy to the float system. Displacement of the float 42, however, increases and overbalances the effect of the weights 53 sufficiently to move the entire float system and the toggle mechanism counter-clockwise into the dotted line position a shown in Fig. 3. The turning moment of the weights 53 is now less than heretofore because the lever arm from the trunnions 37 to the axis of gravity of the weights is shorter and the spring 55 therefore snaps the toggle mechanism clockwise into the full line position b, also shown in Fig. 3. The toggle arms then bear on the tubular outlet extension 61 and are stopped in position b. (It will be apparent that the stopping function of the extension 61 may be performed by other stops if the dimensions of the device are such that the extension 61 is no longer in the proper location to perform its function as a stop.) The entire float system and the toggle mechanism are now lifted above the normal position due to the action of the spring 55 on the toggle mechanism. A downward force is therefore exerted on the valve 16 sufficient to overcome any ordinary sticking of the valve and to close the valve as soon as any obstruction on its seat is removed.

It will be seen that the present invention provides a chamber in which a constant hydrostatic head of fuel is maintained, thereby maintaining a desired flow in the fuel actually supplied to the gravity-fed burner. The fuel level is controlled by a float system having unequal portions and moving an inlet valve toward closed position against the bias of a valve-opening spring. And the float system is subjected to a snap action toggle mechanism acting after the float system has exerted on the valve all of the force possible due to normal rising of the liquid level. The particular advantage of the present device is that the device as a whole may be either temporarily or permanently positioned as much as thirty degrees from horizontal without any effect whatever on the tripping of the float system when the oil level rises over the pivot point of the float system; that is, there will be the same difference between normal level and high level of the oil regardless of the angular displacement of the device up to a limit of thirty degrees. The operation of the device is accordingly unaffected when used on vehicles where the vehicles are stopped on slopes of less than thirty degrees, or when used on boats where the movement of the boat is within the above limit of angular relation to the normal position.

Although but one embodiment of the present invention has been illustrated and described, it will be apparent to those skilled in the art that various changes and modifications may be made therein without departing from the spirit of the invention or the scope of the appended claims.

I claim:

1. In a constant liquid level control device, a casing defining a chamber having inlet and outlet passages, a valve controlling the flow of liquid through the inlet passage into the chamber, a float system buoyed up in the liquid in the chamber and having portions of unequal displacement, a yoke pivotally connected with said float system and connected with said valve to transmit a force thereto upon rising and rocking movement of said float system, and a toggle mechanism pivotally mounted on said float system and actuated thereby by rocking thereof to impart a force to said yoke.

2. In a constant liquid level control device, a casing defining a chamber having inlet and outlet passages, a valve controlling the flow of liquid through the inlet passage into the chamber, a float system buoyed up in the liquid in the chamber, said system including portions of different displacement, a yoke pivotally connected with said float system and connected with said valve to transmit a force thereto upon rising movement of said float system, and a toggle mechanism pivotally mounted on said float system and actuated thereby to impart a force to said yoke, said toggle mechanism being biased toward the float portion of larger displacement.

3. In a constant liquid level control device, a casing defining a chamber having inlet and outlet passages, a valve controlling the flow of liquid through the inlet passage into the chamber, a float system having portions of different displacement buoyed up in the liquid in the chamber, a yoke pivotally connected with said float system and connected with said valve to transmit a force thereto upon rising movement of said float system, and a toggle mechanism pivotally mounted on said float system and actuated thereby to impart a force to said yoke, said toggle mechanism including weights biasing said toggle mechanism in a direction opposite to that of the effect of the larger displacement float portion.

4. In a constant liquid level control device, a casing defining a chamber having inlet and outlet passages, a valve controlling the flow of liquid through the inlet passage into the chamber, a float system having portions of different displacement buoyed up in the liquid in the chamber, a yoke pivotally connected with said float system and connected with said valve to transmit a force thereto upon rising movement of said float system, a toggle mechanism pivotally mounted on said float system and actuated thereby to impart a force to said yoke and including arms pivotally mounted on said yoke, and weights mounted on the arms and biasing said mechanism toward the larger displacement float portion.

5. In a constant liquid level control device, a casing defining a chamber having inlet and outlet passages, a valve controlling the flow of liquid through the inlet passage into the chamber, a float system having portions of different displacement buoyed up in the liquid in the chamber, a yoke pivotally connected with said float system and connected with said valve to transmit a force thereto upon rising movement of said float system, a toggle mechanism pivotally mounted on said float system and actuated thereby to impart a force to said yoke and including arms pivotally mounted on said yoke and extending upwardly therefrom and toward the float portion of larger displacement, and weights mounted on the arms at the upper ends thereof.

6. In a constant liquid level control device, a casing defining a chamber having inlet and outlet passages, a valve controlling the flow of liquid through the inlet passage into the chamber, a float system buoyed up in the liquid in the chamber, said system including portions of different displacement and stops extending upwardly from the larger displacement float portion, a yoke pivotally connected with said float system and connected with said valve to transmit force thereto upon rising movement of said float system, and a toggle mechanism pivotally mounted on said float system and including arms pivotally mounted on said yoke and extending upwardly therefrom and toward the float portion of larger displacement, the upper ends of the arms resting on the stops extending from said float system in the normal level position thereof, and weights mounted on the arms and biasing said mechanism toward the larger displacement float portion.

7. In a constant liquid level control device, a casing defining a chamber having inlet and outlet passages, a valve controlling the flow of liquid through the inlet passage into the chamber, a float system buoyed up in the liquid in the chamber, said system including portions of different displacement, a yoke pivotally connected with said float system and connected with said valve to transmit a force thereto upon rising movement of said float system, and a toggle mechanism pivotally mounted on said float system and actuated thereby to impart a force to said yoke, said toggle mechanism being biased toward the float portion of larger displacement and including a spring connected with the float portion of smaller displacement, the line of action of the spring being above the pivot point of said toggle mechanism.

8. In a constant liquid level control device, a casing defining a chamber having inlet and outlet passages, a valve controlling the flow of liquid through the inlet passage into the chamber, a float system having portions of different displacement buoyed up in the liquid in the chamber, a yoke pivotally connected with said float system and connected with said valve to transmit a force thereto upon rising movement of said float system, and a toggle mechanism pivotally mounted on said float system and actuated thereby to impart a force to said yoke, said toggle mechanism including weights biasing said mechanism in a direction opposite to that of the effect of the larger displacement float portion, and a spring having its line of action above the pivot point of said yoke and opposing the bias of the weights.

9. In a constant liquid level control device, a casing defining a chamber having inlet and outlet passages, a valve controlling the flow of liquid through the inlet passage into the chamber, a float system buoyed up in the liquid in the chamber, the floats being of different volume, a yoke pivotally connected with said float system and connected with said valve to transmit a force thereto upon rising movement of said float system, and a toggle mechanism pivotally mounted on said float system and actuated thereby to impart a force to said yoke, said toggle mechanism including weights biasing said mechanism in a direction opposite to that of the effect of the larger displacement float portion, and including a helical spring under tension and connected with the float portion of smaller displacement, the center line of the spring always being above the pivot point of said toggle mechanism.

10. In a constant liquid level control device, a casing defining a chamber having inlet and outlet passages, a valve controlling the flow of liquid through the inlet passage into the chamber, a float system buoyed up in the liquid in the chamber, the floats being of different volume, a yoke pivotally connected with said float system and connected with said valve to transmit a force thereto upon rising movement of said float system, and a toggle mechanism pivotally mounted on said float system and including toggle arms mounted on the pivots of said yoke, weights mounted on and biasing the arms toward the float portion of larger displacement, and a spring having its line of action above the pivot points of said yoke and opposing the bias of the weights.

LOURDES V. McCARTY.